April 19, 1932.  H. H. THOMPSON  1,854,869
GYROSCOPIC COMPASS
Filed Nov. 20, 1925   2 Sheets-Sheet 1
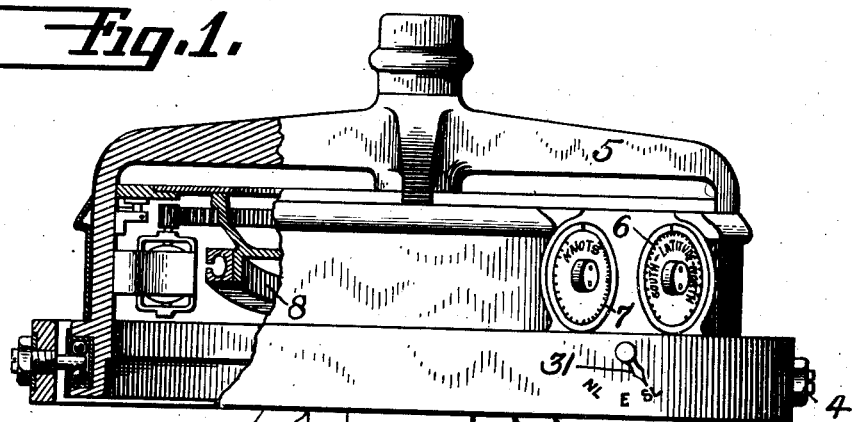
Fig.1.
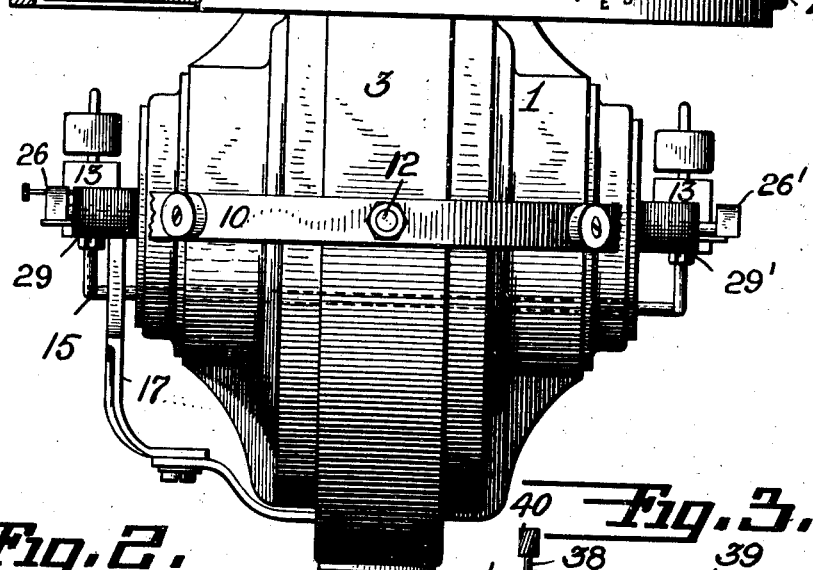
Fig.2.  Fig.3.
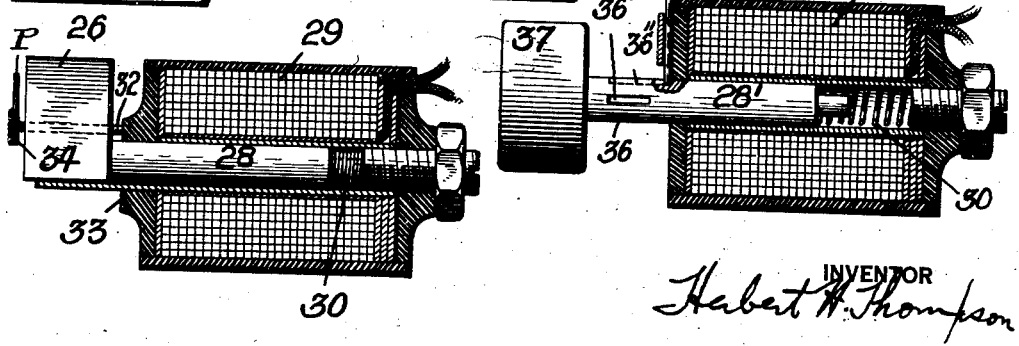
INVENTOR
Herbert H. Thompson April 19, 1932.  H. H. THOMPSON  1,854,869
GYROSCOPIC COMPASS
Filed Nov. 20, 1925   2 Sheets-Sheet 2
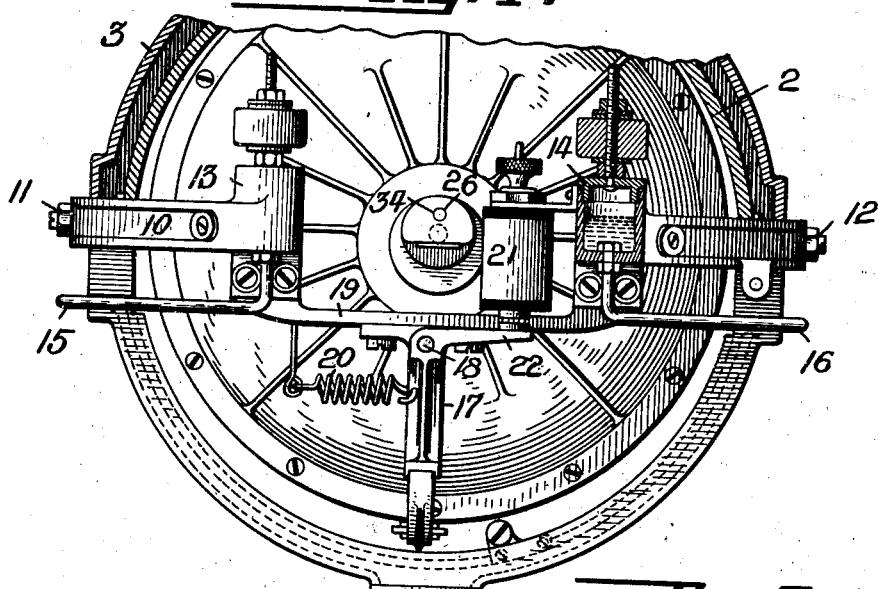
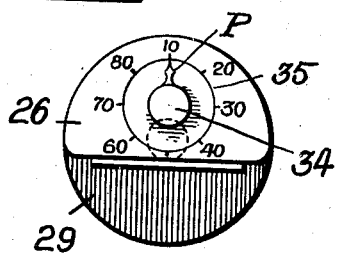
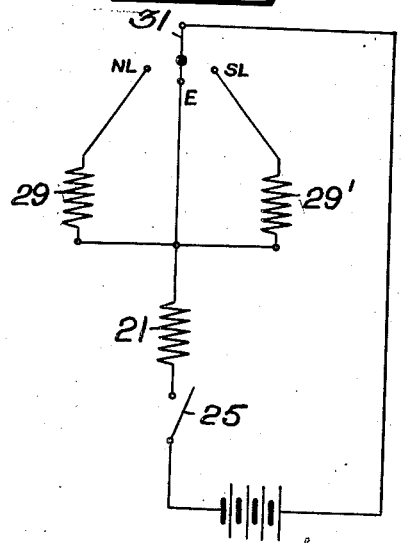
INVENTOR
Herbert H. Thompson Patented Apr. 19, 1932

1,854,869

UNITED STATES PATENT OFFICE

HERBERT H. THOMPSON, OF MOUNTAIN LAKES, NEW JERSEY, ASSIGNOR, BY MESNE ASSIGNMENTS, TO SPERRY GYROSCOPE COMPANY, INC., OF BROOKLYN, NEW YORK, A CORPORATION OF NEW YORK

GYROSCOPIC COMPASS

Application filed November 20, 1925. Serial No. 70,346.

This invention relates to gyroscopic compasses in which means are employed to eliminate the error or oscillations otherwise caused when the ship on which the compass is mounted changes its speed or course. It has been found that oscillations are set up at this time by the damping factor of the compass and to overcome this it has been proposed to substantially eliminate or greatly reduce the damping during this time. I have found, however, that while the elimination of the damping lessens such oscillations, it does not entirely cure them unless further and other means are employed in connection therewith. This becomes especially important where the damping means acts around the vertical axis of the compass as it does in the Sperry type compasses wherein the damping is effected by an eccentric connection between the gravitational or pendulous factor and the gyro casing.

It has long been known that this eccentric connection gives rise to a known and computable error in the settling point of the compass, known as the latitude error, which varies with the latitude and, of course, is an opposite error in north latitudes from the error in south latitudes. It is the practice in the Sperry compass to automatically correct the readings of the compass for this error so that the readings of the compass do not disclose the existence of the same provided the correction device is set for approximately the latitude in which the compass is at the time. The theory and mechanism of such correction devices are now well understood in the art and one form of such mechanism is described in the patent to Elmer A. Sperry, No. 1,255,480 dated February 5, 1918. If, however, the damping is eliminated by eliminating the eccentricity of the connection between the gravitational factor and the compass, it will readily be seen that this will result in a changed settling point of the compass so that even though the damping comes on again, when the turn of the ship is completed, an oscillation will have been set up by this temporary change in the settling point. In addition, of course, during the time of the turn, the reading of the compass may be incorrect as the reading at that time is corrected for a latitude error which is not present.

It is the object of the present invention to overcome the above difficulties and to prevent the setting up of oscillations by the above described cause by providing means to keep the settling point of the compass the same whether the damping is on or off.

While I have illustrated my invention as applied to a Sperry type compass employing a liquid gravitational factor, it will readily be apparent that my invention is applicable to gyroscopic compasses in general.

Referring to the drawings in which I now consider the preferred forms of my invention are shown, Fig. 1 is a side elevation, with parts broken away, of the Sperry type compass with my invention applied thereto.

Fig. 2 is a section of the weight-shifting device which I employ on the compass.

Fig. 3 is a corresponding section of the modified form of weight-shifting device.

Fig. 4 is a side elevation, partly in section, of the gyroscopic portion of the compass with my invention applied thereto.

Fig. 5 is a detail showing the adjusting means for different latitudes.

Fig. 6 is a simplified wiring diagram of my invention.

The drawings show in simple form a standard Sperry compass consisting of the usual gyro rotor casing 1, vertical ring 2, follow-up supporting ring 3, gimbal support 4, and spider 5. The correction device employed on such compasses usually consists of two dials 6 and 7, the former being for latitude and the latter for ship's speed. There is employed in connection with the correction device a cosine cam ring 8 which automatically applies a correction for changes in heading. By means of the setting of dial 6, the proper latitude correction is applied to the readings on the compass card so that although the gyroscope itself is settled a known number of degrees or fraction thereof off the meridian by reason of the latitude error, the true north is shown by the card.

The gravitational factor is illustrated as a frame work 10, pivoted on the follow-up ring 3 on pivots 11 and 12 and carrying, in this instance, two pairs of mercury containers 13 and 14, the units of each pair being connected by pipes 15 and 16. The said gravitational factor is connected to the gyro case by an arm 17 normally placed slightly eccentrically to the vertical line passing through the center of the case.

To eliminate the damping upon change of course or speed, I have shown the same means as is described in my copending application now Patent No. 1,773,412, dated August 19, 1930. As there shown the connecting arm 17 is of a bell crank form and is pivoted at 18 on a bracket 19 attached to the gravitational factor 10. Normally, said arm is held so that its connection with the case at the bottom thereof is eccentric by means of the spring 20. When, however, the electro-magnet 21 is excited, the short arm 22 of the bell crank arm 17 is attracted by the magnet and the arm moves slightly counterclockwise to a central position so that the damping is, by this means, eliminated. The magnet may be excited by any suitable means which can be controlled by a change in course or speed, but as this invention is independent of the specific means employed, I merely represent a switch 25 for this purpose (Fig. 6).

As above explained when the damping is eliminated the settling point of the compass would be changed since the source of the latitude error would no longer be present. To prevent this I mount on the compass one or more shiftable masses or weights 26, 26', which are shown as placed on opposite sides of the compass and are shiftable toward or away from the horizontal axis 11—12 of the compass. I also provide means to shift automatically at least one of these weights when the damping is eliminated. For this purpose I have shown the weight as secured to movable core 28 of solenoid 29 which is preferably placed in the same circuit as the magnet 21. When the solenoid is excited, therefore, the mass will be drawn inwardly compressing the spring 30 but as soon as the solenoid is deenergized, the mass will be moved outwardly by the spring. It will be understood that the mass of the member 26 and the distance through which it moves is so proportioned as to exert about the horizontal axis just sufficient torque to cause the settling point of the compass with the damping eliminated to remain the same as it was with the damping on but with the weight in its original position.

The arrangement so far described could be used with accuracy in one latitude only, for the latitude error, as explained above, varies with the latitude and it is opposite in the north and south latitudes. To make the device, however, of universal application, I have shown means for shifting the center of gravity of the compass in the opposite direction for north and south latitudes. One method of accomplishing this is to have the two weights 26 and 26' independently controllable. The weights are mounted on each side of the compass and a switch 31 (see Figs. 1 and 6). governs which weight shall be moved by its connected solenoid when the ship turns or accelerates.

As shown in Fig. 1, the switch has three positions, one for north latitude, one for the equator, and one for the south latitude. In north latitude the solenoid 29 is employed. On the equator, where there is no latitude error, neither solenoid is employed, and in south latitude the solenoid 29' is employed.

To provide means whereby the weight is shifted a variable amount, dependent upon the degree of latitude, there is shown in Fig. 2 an adjustable screw 32 threaded within the weight 26 to provide a variable stop against the top 33 of the solenoid housing so that the amount that the core 28 is drawn within the solenoid may be varied according to the latitude. If desired a pointer P may be provided on the knurled head 34 of the screw which may be read on graduations 35 on the top 33 indicating the degree of latitude. These graduations need not be finely divided since the latitude error is small and changes in the latitude occur slowly.

A modified method of varying the amount that the weight moves in different latitudes is shown in Fig. 3. Here, instead of employing the screw 32, I provide slots 36—36'—36", etc. in the stem or core 28' attached to the weight 37. A pin 38 slidably mounted on the face of the solenoid 39 is adapted to take in one of said slots or grooves and when so positioned limits the amount that the weight 37 may be shifted and at the same time prevents turning of the weight. When the latitude has changed sufficiently, the operator withdraws the pin 38 by means of the knob 40 thereon, gives the weight 37 a quarter turn, for example, and drops the pin back in the slot under the same at that time. It will be understood that the length of the slots is varied according to the amount necessary to shift the weight for a given latitude, and that graduations similar to those in Fig. 5 may be provided on this form of the invention also. This form of the invention is somewhat superior to that shown in Fig. 2 for the reason that the adjustment for different latitudes does not effect the balance of the compass, whereas the screwing in and out of the screw 32 would have a very slight effect in that respect.

As my invention is employed it will be understood that the handle 31 is set for north or south latitude or the equator, depending on the approximate location of the ship at the time. Likewise the latitude correction device 6 is set and the screw 32 in Fig. 2 or the mass 37 in Fig. 3, according to the degree of latitude. Therefore, when the ship turns or accelerates current is sent only through the magnet 21 if the compass is near the equator. On the other hand, if it is in north latitude it is sent through solenoid 29 and magnet 21 simultaneously, and when in south latitude it will be sent through solenoid 29' and magnet 21. By this means the center of gravity of the compass is shifted temporarily so as to maintain the settling point the same at all times and, therefore, prevent oscillations in the compass from being set up.

It will be understood that the above described method of preventing deviation is applicable whether the damping be entirely eliminated or whether it be greatly reduced or whether it be merely lessened by an appreciable amount. In the latter cases obviously the amount of weight it is necessary to shift to apply the correcting torque is correspondingly reduced. In reading the word "eliminate", therefore, in the appended claims I wish the word to be interpreted broadly in the sense of substantially eliminating or eliminating a whole or a part of the damping.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro compass having a damper for applying a damping torque on said compass, of means for temporarily eliminating said damping torque, and means for simultaneously applying a temporary, non-damping torque on the compass for maintaining the natural settling point of the compass unchanged while the damping is eliminated.

2. In a gyro compass having a damping means, of means for temporarily eliminating the damping, and means for shifting in a N—S direction the center of gravity of the compass while the damping is eliminated and for returning it to normal upon resumption of damping, for the purpose specified.

3. In a gyro-compass, the combination of damping means therefor normally acting about the vertical axis of the compass, of means for temporarily eliminating the damping, and means for temporarily applying a corrective torque about the horizontal axis of the compass to prevent change in the settling point when the damping is eliminated.

4. In a gyro compass having a damper for applying a damping torque on said compass, of means for temporarily eliminating the damping, means for also applying a temporary torque on the compass while the damping is eliminated for maintaining the natural settling point of the compasses unchanged, and means for varying the amount of the torque in accordance with the latitude.

5. In a gyro compass having a damping means, of means for temporarily eliminating the damping, means for also applying a torque on the compass at the time the damping is eliminated for maintaining the natural settling point of the compasses unchanged, and means for reversing the direction of the torque in north and south latitudes.

6. In a gyro-compass, the combination of damping means therefor normally acting about the vertical axis of the compass, of means for temporarily eliminating the damping, means for temporarily applying a corrective torque about the horizontal axis of the compass to prevent change in the settling point, means for varying amount of said torque in accordance with the latitude and means for reversing the direction of the torque in north and south latitudes.

7. In a gyro-compass, a mass movably mounted thereon to vary the center of gravity thereof, electro-magnetic means for displacing the same temporarily in a N—S direction, and means independently settable in accordance with the latitude for varying the amount of such movement for the purpose specified.

8. In a gyro-compass having a correction device for correcting the readings for the latitude error, of means for temporarily eliminating the damping, and means brought into action by said first named means for giving the compass proper substantially the same error as was caused by the damping means whereby the readings of the compass remain correct.

9. In a gyro-compass, means for temporarily shifting the center of gravity thereof comprising an electro-magnetic device mounted thereon, a core or armature slidably and rotatably mounted with respect thereto and adapted to be moved thereby, said core having a plurality of longitudinally extending slots of variable length therein, and a stop pin for taking in the one of said slots which is brought thereunder by rotation of said core.

In testimony whereof I have affixed my signature.

HERBERT H. THOMPSON.